(12) United States Patent
Cox

(10) Patent No.: US 9,169,025 B2
(45) Date of Patent: Oct. 27, 2015

(54) METHOD FOR INFLIGHT DEICING OF LANDING GEAR AND WHEEL BAYS IN AIRCRAFT WITH ONBOARD DRIVE MEANS

(71) Applicant: Borealis Technical Limited, London (GB)

(72) Inventor: Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 13/779,724

(22) Filed: Feb. 27, 2013

(65) Prior Publication Data

US 2015/0210399 A1     Jul. 30, 2015

Related U.S. Application Data

(60) Provisional application No. 61/603,534, filed on Feb. 27, 2012.

(51) Int. Cl.
| | | |
|---|---|---|
| B64C 25/50 | (2006.01) | |
| B64D 15/16 | (2006.01) | |
| B64C 25/34 | (2006.01) | |
| B64C 25/40 | (2006.01) | |
| B64D 15/20 | (2006.01) | |

(52) U.S. Cl.
CPC ............... *B64D 15/16* (2013.01); *B64C 25/34* (2013.01); *B64C 25/405* (2013.01); *B64D 15/20* (2013.01)

(58) Field of Classification Search
CPC ...... B64C 25/405; B64D 15/00; B64D 15/12; B64D 15/20

USPC .......... 244/103 S, 50, 134 R, 134 D
See application file for complete search history.

(56) References Cited

U.S. PATENT DOCUMENTS

| | | | |
|---|---|---|---|
| 4,667,781 A * | 5/1987 | Lilley et al. | 188/382 |
| 6,657,334 B1 | 12/2003 | Edelson | |
| 6,838,791 B2 | 1/2005 | Edelson | |
| 7,116,019 B2 | 10/2006 | Edelson | |
| 7,226,018 B2 | 6/2007 | Sullivan | |
| 7,445,178 B2 * | 11/2008 | McCoskey et al. | 244/50 |
| 7,469,858 B2 | 12/2008 | Edelson | |
| 7,975,960 B2 | 7/2011 | Cox | |
| 8,220,740 B2 | 7/2012 | Cox et al. | |
| 8,403,259 B2 * | 3/2013 | Charuel et al. | 244/103 S |
| 8,444,086 B2 * | 5/2013 | Bucheton et al. | 244/111 |
| 8,485,466 B2 * | 7/2013 | Charles et al. | 244/50 |
| 2008/0258014 A1 | 10/2008 | McCoskey et al. | |
| 2010/0252675 A1 | 10/2010 | Malkin et al. | |
| 2012/0001018 A1 * | 1/2012 | Gilleran et al. | 244/50 |
| 2012/0228921 A1 * | 9/2012 | Essinger et al. | 301/6.2 |
| 2012/0312925 A1 * | 12/2012 | Asfia et al. | 244/134 R |
| 2013/0038179 A1 * | 2/2013 | Mirmobin et al. | 310/67 R |

* cited by examiner

Primary Examiner — Christopher P Ellis
Assistant Examiner — Richard G Davis

(57) ABSTRACT

A method is provided for removing ice, snow, slush, and frozen contaminants from landing gear, wheel wells, and associated structures while an aircraft is in flight and preventing the accumulation of frozen contaminants during flight in an aircraft equipped with onboard drive means powered to drive at least one landing gear wheel and selectively controllable to move the aircraft on the ground during taxi in winter and other weather conditions.

15 Claims, 2 Drawing Sheets

METHOD FOR INFLIGHT DEICING OF LANDING GEAR AND WHEEL BAYS IN AIRCRAFT WITH ONBOARD DRIVE MEANS

PRIORITY CLAIM

This application claims priority from U.S. Provisional Patent Application No. 61/603,534, filed 27 Feb. 2012, the disclosure of which is fully incorporated herein.

TECHNICAL FIELD

The present invention relates generally to methods for preventing ice accumulation and deicing or removing ice from aircraft during flight and specifically to a method for ice removal and preventing ice build up in landing gear bays and/or wheel wells during flight in an aircraft equipped with onboard drive means for autonomous ground travel.

BACKGROUND OF THE INVENTION

The safety of air travel during inclement winter weather has increased as procedures relating to safe cold weather operations have been implemented by airlines and methods for removing ice and preventing ice build up have improved. United States Federal Aviation Administration (FAA) regulations, as well as those of international regulatory authorities, clearly prohibit the take off of an aircraft when frost, ice, or snow is adhering to the aircraft's wings or other critical surfaces. Additionally, dispatch or take off of an aircraft is prohibited by the FAA when environmental conditions indicate a reasonable expectation that frost, ice, or snow may adhere to aircraft surfaces, unless there is in place an approved ground deicing and anti-icing program. An aircraft with frost, ice, and/or snow on its wings cannot operate aerodynamically and may be at risk for problems caused by increased drag and stall speed and uneven lift.

Ground crews and/or contractors are usually charged with carrying out the procedures required to remove frost, ice, and snow from aircraft surfaces and the procedures required to prevent the build up of these frozen contaminants on aircraft surfaces. Deicing and anti-icing procedures typically involve the application of liquids formulated to melt frozen water and to prevent it from re-forming on aircraft surfaces. In some situations, these fluids are heated to improve melting. The fluids used to deice runways are different from those used on aircraft surfaces, and the two types of fluids may not be compatible. Runway deicing fluids, moreover, both alone and in combination with aircraft surface deicing fluids, can damage aircraft surfaces on wings and tails as well as wheel brakes, electrical system connectors, and hydraulic system components. It is generally recommended that deicing fluids not be sprayed directly onto aircraft wheels or brake assemblies or landing gear structures.

The deicing of runways may effectively melt ice or snow. The melted ice and snow form slush, however, which can build up on aircraft wheels and landing gear, including landing gear doors, bays, and switches. To help mitigate this, it is recommended that slush, frost, ice, and snow be removed from areas where an aircraft's nose and main landing gear tires will be positioned when the aircraft is parked at a gate or parking location. It is also recommended that these contaminants be removed from the aircraft's wheels and landing gear structures prior to take off. The Association of European Airlines (AEA) recommends that the application of deicing fluid in the landing gear and wheel bay areas should be kept to a minimum, if used at all. The use of means other than fluid, such as mechanical removal, air blast, heat, and hot air are recommended by the AEA to remove accumulations of blown snow. Deposits of snow or slush that have bonded to landing gear and wheel bay surfaces can be removed with hot air or hot deicing fluids. The aforementioned procedures may effectively remove frozen water deposits, such as slush and the like, from wheels, landing gear, and wheel bays prior to departure from a gate or a deicing station. Since the use of anti-icing agents on these structures is generally prohibited, there is no guarantee that additional deposits will not be accumulated during taxi on a treated wet or slushy runway prior to take off. Air temperatures encountered by an aircraft after take off and during flight in winter weather are likely to be cold enough to freeze water and/or slush present on landing gear structures or in wheel bays.

The movement of an aircraft on the ground during taxi with motors designed to move the aircraft's wheels with minimal or no assistance from the aircraft's main engines has been proposed. In U.S. Pat. No. 7,445,178 to McCoskey et al and U.S. Pat. No. 7,226,018 to Sullivan, for example, systems able to move aircraft on the ground during taxi using wheel motors are described. U.S. Pat. Nos. 7,975,960 and 8,220,740 to Cox et al, owned in common with the present application, describe a nose wheel control apparatus capable of driving a taxiing aircraft independently on the ground. None of these patents or publications, however, describes using the wheel motors or systems disclosed therein to move aircraft on the ground in adverse cold weather environmental conditions or that these devices have any function in the presence of snow, ice, slush, or other frozen contaminants.

The use of aircraft wheel motors both to move an aircraft on the ground and to perform an additional function is suggested in U.S. Patent Application Publications Nos. US2008/0258014 to McCoskey et al and US2010/0252675 to Malkin et al. McCoskey et al describes the use of a motor/generator mounted on and operated by the rotation of an aircraft wheel to create electrical energy from kinetic energy and suggests recovering waste heat from kinetic landing and transferring the recovered heat away from the aircraft through a transmission grid to a remote airport location for reuse. Malkin et al suggests the use of an electric motor to propel an aircraft's wheels during taxi and then to drive a compressor when the aircraft is in flight. Neither of these publications, however, suggests that the wheel motors described therein are useful for other purposes or that they could be used during adverse cold weather conditions to maintain wheel or landing gear structures free from frozen contaminants either on the ground or during flight.

A need exists for a method for the inflight deicing of aircraft landing gears, wheel wells, and associated structures and maintaining these structures free from frozen water contaminants, including ice, snow, slush, and frost, that employs an existing aircraft onboard drive means also used to move the aircraft during taxi on the ground.

SUMMARY OF THE INVENTION

It is a primary object of the present invention, therefore, to provide a method for the inflight deicing of aircraft landing gears, wheel wells, and associated structures and maintaining these structures free from frozen water contaminants, including ice, snow, slush, and frost, that employs an existing aircraft onboard drive means also used to move the aircraft during taxi on the ground.

It is another object of the present invention to provide a method for the inflight removal of ice and prevention of ice accumulation in an aircraft landing gear or wheel well that does not require the application of chemicals.

It is an additional object of the present invention to provide a method for the inflight removal of ice and prevention of ice accumulation in landing gear and associated structures that uses heat produced by the aircraft's onboard drive means during ground taxi.

It is a further object of the present invention to provide a method for reducing the forces required to extend a landing gear prior to landing by removing ice and preventing ice accumulation on aircraft landing gear structures during flight.

It is yet another object of the present invention to provide a method for removing from and preventing the accumulation of frozen contaminants from an aircraft's landing gear, wheel wells, and associated structures when the aircraft is in flight by providing onboard drive means in driving relationship with one or more of the aircraft's landing gear wheels controllable to generate sufficient heat to melt the frozen contaminants and prevent the formation of additional frozen contaminants.

It is a yet a further object of the present invention to provide an aircraft with onboard drive means drivingly associated with at least one aircraft landing gear wheel and controllable to move the aircraft on the ground and to capture the heat produced by operation of the drive means for inflight removal of ice and prevention of ice build up in landing gear, wheel wells, and associated structures.

The aforesaid objects are achieved by providing an aircraft equipped with onboard drive means to drive at least one landing gear wheel and selectively controllable to move the aircraft on the ground independently during taxi to produce sufficient heat to remove frozen contaminants from landing gear, wheel wells, and associated structures while the aircraft is in flight and to prevent the accumulation of frozen contaminants on these structures during flight.

Other objects and advantages will be apparent from the following description, drawings, and claims.

DESCRIPTION OF THE INVENTION

Figure 1:
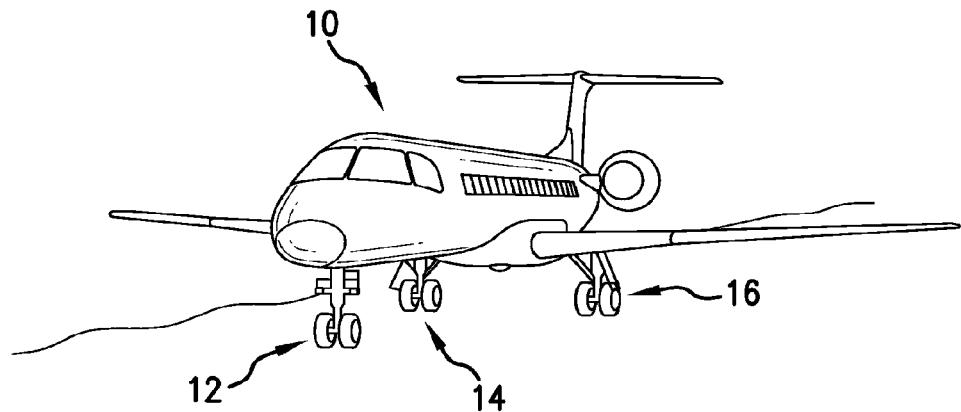
FIG. 1 illustrates, in front perspective view, an aircraft equipped with onboard drive means wherein landing gear is extended so that wheels contact a slush-covered runway and the onboard drive means are controllable according to the method of the present invention to remove frozen contaminants while the aircraft is on the ground.

The importance of removing ice and other frozen contaminants from aircraft surfaces and structures and preventing the build up of frozen contaminants cannot be overstated. As discussed above, procedures currently in use prior to take off are generally effective in deicing exposed aircraft surfaces and applying anti-icing agents to those surfaces to prevent ice build up during flight. When taxiways and runways are wet or covered with frozen or partially frozen contaminants, such as frost, ice, snow, slush, or the like, aircraft wheels directly contact these frozen contaminants, and landing gear components and surrounding structures may be sprayed with melting snow or slush during taxi. The likelihood of these partially frozen and frozen contaminants remaining on landing gear and in wheel wells after the aircraft takes off and the landing gear is retracted is very high. When outside air temperatures are below freezing, which is likely to be encountered when an aircraft travels at high altitudes and at lower altitudes during winter weather, water and partially frozen contaminants on wheels, in wheel bays, and/or on landing gear components can re-freeze within a closed landing gear bay when the aircraft is in flight. Even when a runway is only wet, such as may occur with steady or heavy rain, water remaining on landing gear structures may freeze when environmental temperatures drop below freezing during flight at a sufficiently high altitude.

Even a relatively small amount of ice formed by residual frozen fluids can interfere with extension of the landing gear when the aircraft is cleared for landing. The forces required to extend a landing gear covered with ice might be greater than the landing gear extension mechanism can handle, which could result in damage to these structures or, possibly, a landing gear that will not extend at all and an aircraft that is unable to land. Additionally, if a significant amount of ice accumulates inside the landing gear bay doors, these doors could be prevented from opening. When weather conditions and, hence, runway conditions are wet, particularly when the weather is cold, icy, or snowy, water, ice, and snow are very likely to be deposited on an aircraft's wheels, landing gear, and associated structures during ground travel, even if the ice and snow was initially removed prior to the aircraft's departure from a gate. The present method provides a way to overcome these situations by removing and preventing the accumulation of ice and other frozen contaminants from landing gear and wheel structures after an aircraft has taken off and is in flight.

To employ the method of the present invention, an aircraft must be equipped with onboard drive means positioned to drive one or more of the aircraft's landing gear wheels during ground travel autonomously without reliance on the aircraft's main engines. A powered self-propelled nose or main landing gear wheel is uniquely positioned to maneuver an aircraft in a variety of circumstances on the ground. The drive means for the powered drive wheel optimally exerts sufficient power to move the aircraft at runway speeds, and its small size enables the drive means to fit within a drive wheel, in the landing gear space, or in another convenient location. An aircraft with a powered self-propelled nose gear or main gear wheel will have one or more drive means mounted in driving relationship with one or more of the aircraft landing gear wheels to move the wheels at a desired speed and torque. Drive means useful for this purpose may be selected from those known in the art. One preferred drive means is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric, pneumatic, or hydraulic drive means capable of driving an aircraft on the ground, including but not limited to electric induction motors, permanent magnet brushless DC motors, switched reluctance motors, hydraulic pump/motor assemblies, and pneumatic motors may also be used to power aircraft drive wheels in accordance with the present invention. Other motor designs capable of high torque operation across a preferred speed range that can be integrated into an aircraft drive wheel to function as described herein may also be suitable for use to move aircraft in connection with the inflight deicing system of the present invention.

The many advantages of being able to drive an aircraft on the ground autonomously without using the aircraft main engines have been acknowledged. One of the challenges presented by the onboard powered wheel drive assemblies that have been proposed for use in moving aircraft during ground travel is providing adequate dissipation of the heat that builds up in the drive means during operation. Moving a commercial sized aircraft on the ground with a drive means causes heat to build up in the drive means, and this heat must normally be directed away from the drive means components if they are to continue to operate effectively. When the drive means is an electric motor, the current required to power the electric motor heats the motor coil, and the rotation of the rotor at the high speed required to move an aircraft generates heat. High loads also lead to heat generation in a drive motor. Although heat dissipation from a drive means may be required to counter heat generation when loads are high to keep the drive means in operation, the present method employs this heat for a useful purpose when aircraft ground travel and environmental conditions result in the formation of ice and other frozen contaminants on landing gear and wheel structures and/or in landing gear bays and wheel wells.

The size of the drive means and, thus, the mass available for thermal distribution in an aircraft wheel drive assembly is generally limited by the possible locations for the drive means on or in an aircraft. A drive means preferred for use in the present invention must located in relationship to the landing gear, wheel, landing gear bay, or wheel well structures to effectively distribute heat generated by drive means operation to these structures to remove frozen contaminants and/or prevent the accumulation of frozen contaminants. The location of a drive means within or in contact with an aircraft wheel can provide a solid thermal connection between the drive means and the hardware of a wheel axle, a landing gear piston, and other connected structures. This solid thermal connection increases mass available for heat transfer and further enables the movement of heat through these large metallic components to raise their temperature high enough to melt ice while directing heat away from the drive means.

Referring to the drawings, FIG. 1 illustrates an aircraft 10 on the ground, in the context of the present invention on a wet or slushy runway. The aircraft 10 has a nose landing gear 12 and two sets of main landing gear 14 and 16. In the landing gear arrangement shown, both nose and main landing gears each include two wheels. One or more drive means, such as the drive means discussed above and in connection with FIGS. 3 and 4, is located to drive at least one of the wheels in a nose landing gear 12 or in a main landing gear 14, 16, preferably in direct or indirect thermal contact with landing gear structures where ice deposits may form during taxi and/or flight. In some aircraft, it will be preferred to locate a drive means in each of the nose or main landing gear wheels. For the most effective ice removal and prevention of ice accumulation, it is preferred to locate at least one drive means in at least one wheel or other location in a nose or main landing gear.

Figure 2:
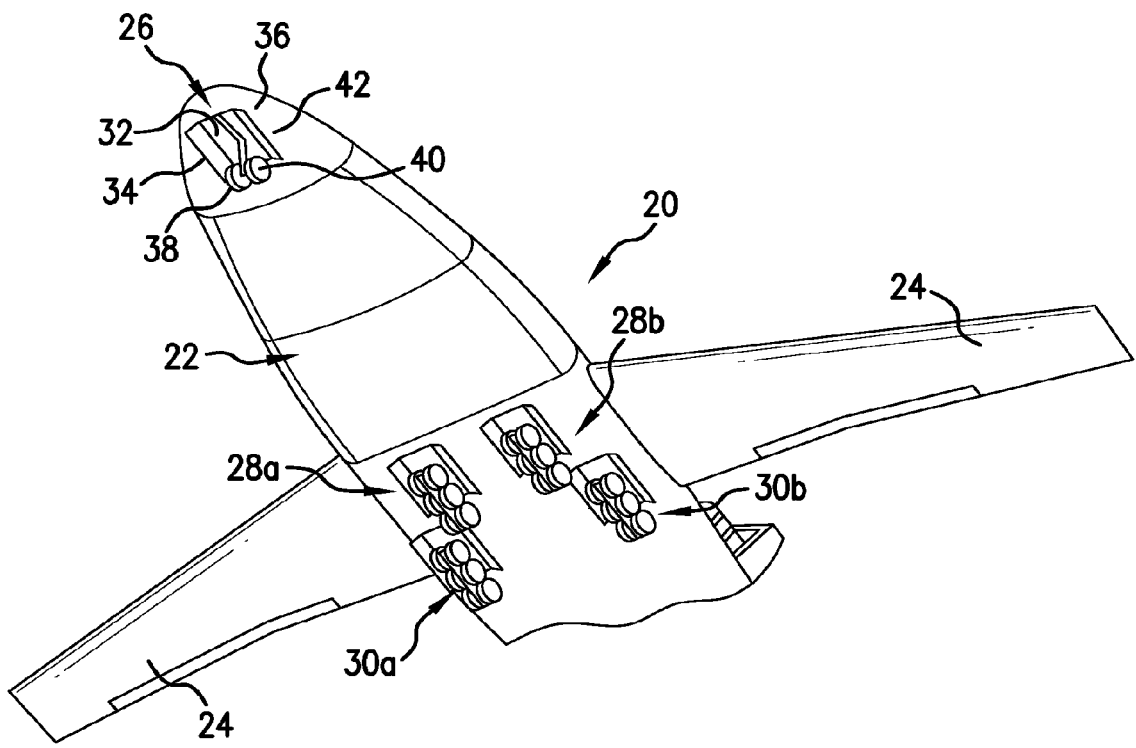
FIG. 2 illustrates a portion of an underside of an aircraft equipped with onboard drive means controllable to melt frozen contaminants during flight in accordance with the present invention with the landing gear in the process of being extended or retracted.
Figure 4:
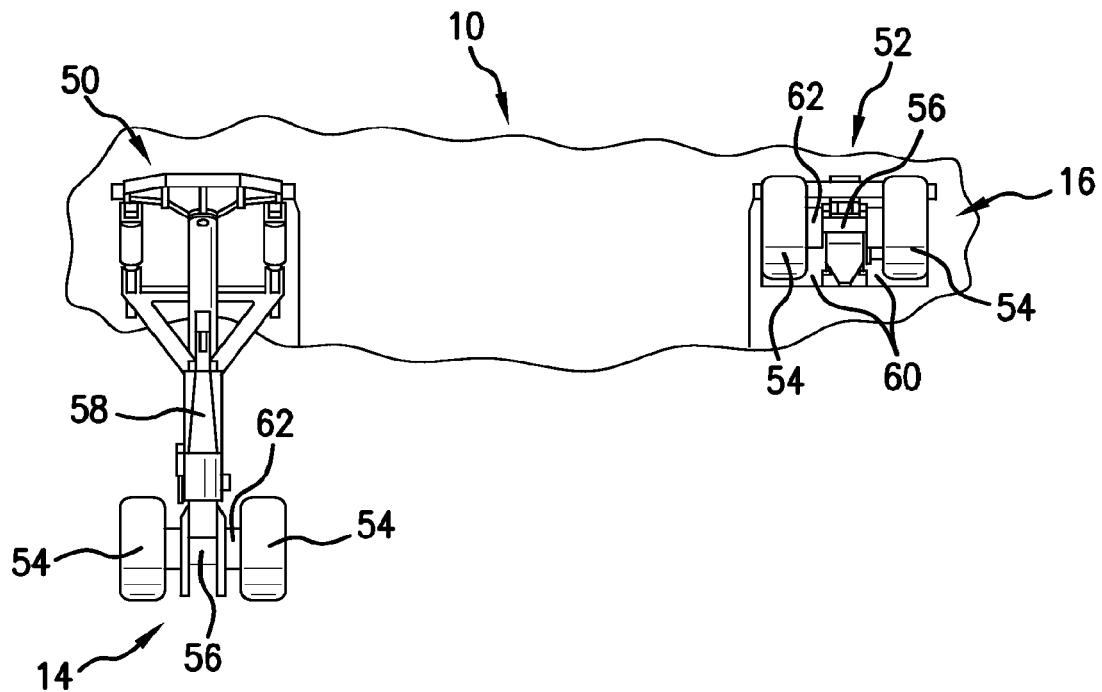
FIG. 4 illustrates a schematic cross-sectional view of one configuration of main landing gear in an aircraft equipped with onboard drive means controllable according to the present invention to melt frozen contaminants with the landing gear shown retracted into the landing gear bay and extended to contact a runway surface.

FIG. 2 is a view of the underside of a portion of the body 22 of an aircraft 20 in flight and shows the wings 24 and nose and main landing gear. The landing gear are shown in the process of being retracted into the landing gear bays after take off or, alternatively, being extended prior to landing. The aircraft 20 has a nose landing gear 26 and four sets of main landing gears 28a, 28b, 30a, and 30b. Although only the nose landing gear will be described in detail, this description also applies to the main landing gear. The nose landing gear 26 is installed in a nose landing gear bay 32. Doors 34 and 36 are provided to open and close the landing gear bay 32 to allow the landing gear 26, which includes wheels 38 and 40 rotatably mounted on a strut 42, to be retracted into the landing gear bay 32 during flight and extended from the aircraft for landing, as shown in FIG. 4. Landing gear and landing gear bays may also include other structures that are not shown that permit aircraft landing gear to function as required. The main landing gears 28a, 28b, 30a, and 30b each have three sets of paired wheels, but are otherwise function in a substantially similar manner as the nose landing gear.

Figure 3:
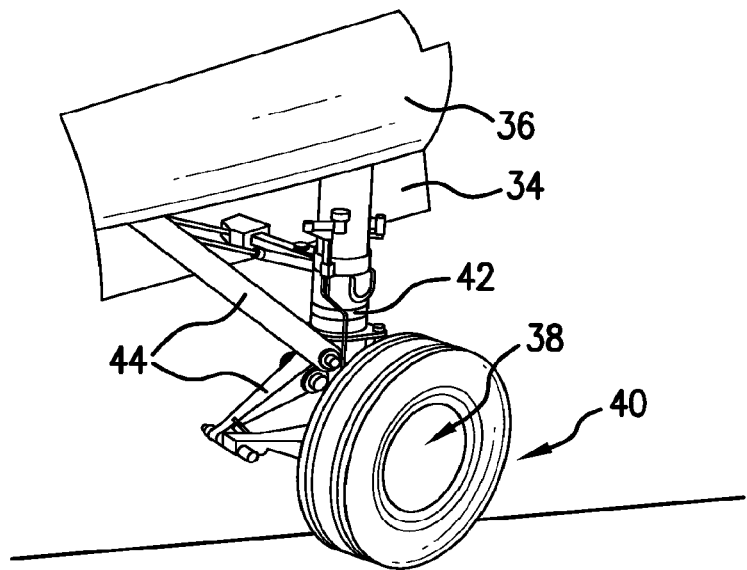
FIG. 3 illustrates, in perspective view, a single landing gear wheel provided with an onboard drive means in accordance with the present invention.

FIG. 3 shows a single wheel 40 of the nose landing gear 26 of FIG. 2. This wheel could also be a wheel from a main landing gear, such as one of the main landing gears 14 and 16 of the aircraft 10 shown in FIG. 1 or one of the main landing gears 28a, 28b, 30a, and 30b of the aircraft 20 shown in FIG. 2. The wheel 40 is rotatably mounted, preferably on an axle as shown in FIG. 4, and supported by a strut 42 that connects the wheel and axle to the aircraft. The landing gear further includes one or more articulated or hinged landing gear braces 44 or equivalent structures that are designed to extend the wheels from a landing gear bay 32 (FIG. 2) prior to landing and to retract the wheels into the landing gear bay 32 after take off. Landing gear bay doors 34 and 36 are shown in an open position to allow extension the landing gear wheel 40. A drive means 38, which is preferably one of the drive means described above, may be located within the wheel 40. The drive means could also be located, as indicated above, in any other convenient position to drive the wheel 40, such as, for example, inboard on an axle on the strut 42 side of the wheel, outboard of the wheel, or in another location associated with a landing gear bay 32 or a wheel well 60, as discussed in connection with FIG. 4. It is especially preferred that the drive means be positioned so that heat generated during operation can be transferred directly or indirectly to landing gear and wheel bay structures, for example the strut 42 and brace 44 in FIG. 3 and corresponding structures in FIG. 4, to melt any frozen contaminants and to prevent the accumulation of frozen contaminants.

FIG. 4 illustrates main landing gear bays 50 and 52 in an aircraft having a main landing gear configuration like the aircraft 10 in FIG. 1, with two sets of main landing gears 14 and 16. Each set of main landing gears 14 and 16 has two wheels 54 rotatably mounted on an axle 56 attached to a strut 58. The wheel wells 60 are visible in the landing gear bay 52. In the main landing gear arrangement shown in FIG. 4, a single drive means 62 is located on the inboard side of one wheel 54 of each landing gear 14 and 16. An additional drive means could be located on the inboard side of the other wheel or in any other appropriate location in or on landing gear structures or within the wheel bay 60 that is in direct or indirect thermal contact or connection with these structures, such as, for example, on the outboard side of one or both wheels or completely within one or both wheels.

An aircraft equipped with drive means, such as, for example drive means 38 in FIG. 3 or drive means 62 in FIG. 4, is designed to be controllable by a pilot in the cockpit or remotely from another location to drive the aircraft autonomously on the ground during taxi without reliance on the aircraft's main engines. When the aircraft is cleared for departure, the drive means is activated to move the aircraft on the ground during pushback and taxi to a runway for take off. As discussed above, during winter weather conditions, the landing gear structures and wheels will be inspected for the presence of ice, snow, and other frozen contaminants, and these contaminants will be removed, usually manually, prior to pushback. As the aircraft is propelled on the ground by the drive means, ice, snow, or slush from untreated runway surfaces and water from treated runway surfaces are likely to be deposited on the landing gear, wheels, and associated structures. When the aircraft takes off, any frozen contaminants and water adhering to the wheels, landing gear, and associated structures will remain when the landing gear is retracted into the landing gear bay after take off.

In the past, this water and any frozen contaminants would freeze in place during flight and remain frozen. Depending on the extent of ice accumulation, the force required to extend the iced landing gear prior to landing could interfere significantly with, or possible even prevent, landing gear extension. The operation of drive means to move an aircraft independently on the ground, as described herein, generates heat during taxi that is sufficient to melt ice, snow and/or slush and to prevent the formation of ice, even when the aircraft travels between its departure and take off locations on a snow or ice-covered taxiway or runway. After take off, when the drive means is not in operation, residual heat from the drive means and heat transferred to wheel wells and other structures will promote the evaporation of water to dry these surfaces and will keep the landing gear, wheels, and associated structures at a temperature high enough to prevent any melted ice or snow from re-freezing during flight.

Since the landing gear and associated structures of an aircraft equipped with drive means as described herein are likely to be free of frozen contaminants during flight, interference with landing gear extension due to ice accumulation prior to landing should not occur. When the aircraft lands in winter weather on an ice, snow, or slush-covered runway, activation of the drive means to move the aircraft during taxi should produce sufficient heat to prevent or minimize the formation or accumulation of frozen contaminants on wheels and landing gear structures during taxi to an arrival location. In the unlikely event that water or melted ice in a landing gear bay or wheel well did not evaporate during flight and temperatures dropped low enough to cause the water to freeze and the presence of this ice is detected, the drive means could be activated prior to landing with or without spinning a drive wheel to produce sufficient heat to melt any ice that could interfere with landing gear extension or wheel operation.

It is contemplated that power can be controllably directed to the drive means without engaging its corresponding drive wheel. The spinning operation of an unengaged drive means will generate heat and may produce some air flow, which can effectively melt ice or other frozen contaminants on landing gear and/or wheel structures without causing a drive wheel to spin. In some situations, particularly, for example, if an ice seal, described as gear lock, has formed between an aircraft wheel and the bushings that normally prevent the wheel from spinning, it will be beneficial to be able to control the drive means to spin a drive wheel to melt the ice causing the gear lock. In extreme cases when an iced landing gear does not extend, engaging the drive means can break this kind of ice seal and allow the landing gear to extend.

When the drive means of the present method is not needed to produce heat that will remove frozen contaminants and/or to prevent the accumulation of frozen contaminants in wheel wells or on landing gear structures in adverse weather conditions, the heat generated by the drive means is directed to heat dissipation structures and/or to a heat dissipation system (not shown) designed to prevent overheating of the drive means. Suitable control means (not shown) are provided for this.

It is further contemplated that sensors, such as, for example, temperature sensors or the like could be provided in selected locations in landing gear bays, wheel wells, or elsewhere to monitor the temperature in these locations and/or identify the presence or likelihood of the presence of ice. This information would be communicated to a control system that could be selectively automatically or manually activated to either operate the drive means when the aircraft is in flight if ice accumulation beyond a predetermined level has occurred, or merely run a trickle charge into the drive means. A trickle charge flowing to the drive means will heat the drive means above a predetermined temperature that can be set to melt frozen contaminants and free the landing gear for movement. The location of a drive means in a landing gear bay or wheel well or on or within a landing gear wheel would be preferred in this situation.

The application of a trickle charge, as described above, can provide additional benefits during the cold weather operation of aircraft. For example, thermal contraction effects on drive means and associated structures can be reduced. The heat generated by a trickle charge can also remove frozen contaminants and help to ensure that the drive means and the landing gear are free of these contaminants and can operate normally. Additionally, the heat produced by a trickle charge directed to the drive means can keep the temperature of the landing gear tires within a range that can increases their flexibility and extends tire operating life, allowing them to be used for more landing cycles.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in providing a method for removing ice, snow, slush, and frozen contaminants from aircraft landing gear, wheel wells, wheels, and associated structures and preventing the accumulation of frozen contaminants on landing gear, wheel wells, wheels, and associated structures when an aircraft equipped with onboard drive means for taxi is in flight.

The invention claimed is:

1. A method for inflight deicing to remove frozen contaminants from landing gear and wheel bays in an aircraft with onboard drive means comprising:
   a. providing one or more onboard drive means selectively controllable to power one or more aircraft landing gear wheels to move the aircraft during taxi without reliance on the aircraft main engines;
   b. locating the one or more drive means in direct or indirect thermal contact with one or more aircraft landing gear wheels or landing gear support structures; and
   c. selectively controlling the one or more drive means to operate the drive means and power the one or more aircraft landing gear wheels to autonomously taxi the aircraft on a treated or untreated snow or ice-covered surface from a departure location to a take off location, and operating the one or more drive means to produce sufficient heat to remove ice, snow, or frozen contaminants from the landing gear wheels or landing gear support structures in thermal contact with the drive means and to prevent the accumulation of ice, snow, or frozen contaminants on structures in thermal contact with the drive means after the aircraft takes off and is in flight.

2. The method of claim 1, wherein the landing gear wheels or landing gear support structures comprise wheel bays, landing gear bays, wheel axles, struts, or braces.

3. The method of claim 1, wherein the one or more drive means is selected from the group comprising electric drive means, hydraulic drive means, and pneumatic drive means.

4. The method of claim 3, wherein the one or more drive means comprises an electric drive means.

5. The method of claim 4, wherein an onboard drive means is provided and located in each one of an aircraft's two nose landing gear wheels and the operation of the drive means is controlled to power the nose landing gear wheels and move the aircraft autonomously during taxi and to maintain the aircraft's nose landing gear wheels free from frozen contaminants during flight.

6. The method of claim 4, wherein an onboard drive means is provided and located in at least one of each pair of an aircraft's main landing gear wheels and the operation of the drive means is controlled to power the main landing gear wheels and move the aircraft during taxi and to maintain the aircraft's main landing gear wheels free from frozen contaminants during flight.

7. The method of claim 1, wherein the one or more drive means is provided in one or more nose landing gear wheels or in one or more main landing gear wheels.

8. The method of claim 1, wherein a drive means is provided for each of the aircraft's landing gear wheels and located in each of the landing gear wheels.

9. The method of claim 1, wherein the aircraft wheels and landing gear structure are maintained at a temperature during taxi to keep the wheels and landing gear structures substantially free from ice, snow, or frozen contaminants during taxi and after take off.

10. A method for inflight deicing of nose and main wheel landing gear wheels and structures in an aircraft equipped with onboard drive means to drive the aircraft autonomously on the ground in winter weather conditions comprising:
   a. providing onboard drive means controllable to drive at least one wheel in each nose landing gear or each main landing gear in an aircraft;
   b. locating each said onboard drive means in driving relationship with said at least one wheel and in thermal contact with structures in each said landing gear;
   c. selectively controlling said drive means to power each said wheel as required to drive the aircraft on the ground in winter weather conditions during pushback and taxi between a departure location and a take off location; and
   d. directing heat produced by said drive means during taxi to landing gear structures in thermal contact with said drive means to raise the temperature of said structures to a level able to melt ice and maintaining the temperature at said level to prevent the formation of ice on said structures after take off and during flight.

11. A method comprising inflight deicing to remove frozen contaminants from landing gear and wheel bays in an aircraft with onboard drive means, further comprising:
   a. providing one or more onboard drive means selectively controllable to engage or disengage one or more aircraft landing gear wheels to power said wheels to move the aircraft during taxi without reliance on aircraft main engines;
   b. locating the one or more drive means in direct or indirect thermal contact with one or more aircraft landing gear wheels or landing gear structures;
   c. providing sensor means capable of detecting the presence of ice or frozen contaminants in landing gear or wheel bays or on landing gear wheels or landing gear wheel structures and communicating the presence of ice to a control system; and
   d. when said sensors indicate the presence of ice, selectively activating the control system to controllably direct power to the one or more drive means to operate the drive means when the one or more aircraft wheels is controllably disengaged, whereby operation of the one or more drive means produces sufficient heat to remove ice, snow, or frozen contaminants from the landing gear wheels or landing gear structures in thermal contact with the drive means when the aircraft is in flight.

12. The method of claim 11, wherein said control system is designed to be activated manually or automatically when the presence of ice is detected during flight to controllably direct power to said one or more drive means.

13. The method of claim 11, wherein power directed to said one or more drive means is in the form of a trickle charge manually or automatically selected to operate said one or more drive means and cause the drive means to be heated to a temperature above a predetermined temperature required to remove detected ice or frozen contaminants.

14. The method of claim 11, wherein said sensor means are positioned to detect the presence of ice or frozen contaminants on at least landing gear extension structures, landing gear bay doors, wheel wells, and landing gear wheels.

15. The method of claim 11, wherein when said sensors indicate the presence of ice, selectively activating the control system to controllably direct power to the one or more drive means to operate the drive means and engaging the one or more aircraft wheels, whereby operation of the one or more drive means also spins one of more aircraft wheels to produce sufficient heat to remove ice, snow, or frozen contaminants from the landing gear wheels and structures in thermal contact with the wheels when the aircraft is in flight.

* * * * *